United States Patent
Starhill

(10) Patent No.: US 8,938,484 B2
(45) Date of Patent: Jan. 20, 2015

(54) MAINTAINING DEPENDENCIES AMONG SUPERNODES DURING REPEATED MATRIX FACTORIZATIONS

(75) Inventor: Philip M. Starhill, Lafayette, CO (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 13/487,048

(22) Filed: Jun. 1, 2012

(65) Prior Publication Data

US 2013/0325917 A1 Dec. 5, 2013

(51) Int. Cl.
G06F 7/32 (2006.01)

(52) U.S. Cl.
USPC .......................................................... 708/520

(58) Field of Classification Search
CPC . G06F 17/16; G06F 15/8076; G06F 15/8092; G06F 7/4806; G06F 9/30036
USPC .......................................................... 708/520
See application file for complete search history.

(56) References Cited

U.S. PATENT DOCUMENTS

| | | | |
|---|---|---|---|
| 5,983,230 A | 11/1999 | Gilbert et al. | |
| 6,397,236 B1 | 5/2002 | Garg et al. | |
| 6,601,080 B1 | 7/2003 | Garg | |
| 7,089,275 B2 | 8/2006 | Garg | |
| 7,174,540 B2 | 2/2007 | Ondrusek et al. | |
| 8,583,719 B2 * | 11/2013 | Nakanishi | 708/520 |
| 2009/0265150 A1 | 10/2009 | Ye et al. | |
| 2009/0271433 A1 | 10/2009 | Perronnin et al. | |
| 2009/0299996 A1 | 12/2009 | Yu et al. | |
| 2010/0241683 A1 | 9/2010 | Nakanishi | |
| 2010/0299379 A1 | 11/2010 | Das Gupta et al. | |

OTHER PUBLICATIONS

Oancea, Bogdan; "Improving the Performance of Sparse LU Matrix Factorization Using a Supernodal Algorithm", Journal of Applied Quantitative Methods, vol. 3, No. 2, Summer 2008.

Naik et al.; "Data Traffic Reduction Schemes for Sparse Cholesky Factorizations", Institute for Computer Applications in Science and Engineering; Feb. 1988, pp. 1-35, USA.

Cosnard et al.; "Using Postordering and Static Symbolic Factorization for Parallel Sparse LU", In Proceedings of the International Parallel and Distributed Processing Symposium (IPDPS), May 1-2, 2000, pp. 807-812.

Eswar et al.; "Supernodal Sparse Cholesky Factorization on Distributed-Memory Multiprocessors", ICPP Inter. Conf. on, vol. 3, Aug. 16-20, 1993, pp. 18-22.

* cited by examiner

*Primary Examiner* — Tan V. Mai

(74) *Attorney, Agent, or Firm* — Patterson & Sheridan, LLP

(57) ABSTRACT

Advantageously, embodiments of the invention provide techniques for determining dependency relationships between matrix supernodes by storing a list of dependencies for each supernode in a data structure and augmenting this list as needed when a column is moved from one supernode to another while factorizing a series $A_i$ of symmetric matrices. As iterating over all supernodes to determine which supernodes a given supernode depends on at the beginning of each factorization adds significant overhead to the computation, embodiments described above maintains a supernode dependency data structure used for each successive factorization, greatly reducing the overhead of the dependency determination.

21 Claims, 6 Drawing Sheets

$$\begin{matrix}
 & 1 & 2 & 3 & 4 & 5 & 6 & 7 & 8 & 9 & 10 & 11 & 12 \\
1 & * \\
2 & * & * \\
3 & 0 & 0 & * \\
4 & 0 & 0 & * & * \\
5 & 0 & 0 & 0 & 0 & * \\
6 & 0 & 0 & 0 & 0 & * & * \\
7 & * & * & 0 & 0 & * & * & * \\
8 & * & * & 0 & 0 & * & * & * & * \\
9 & 0 & 0 & * & * & 0 & 0 & * & * & * \\
10 & 0 & 0 & * & * & 0 & 0 & * & * & * & * \\
11 & 0 & 0 & 0 & 0 & 0 & 0 & 0 & 0 & * & * & * \\
12 & 0 & 0 & 0 & 0 & 0 & 0 & 0 & 0 & * & * & * & *
\end{matrix}$$

```
SUPERNODE      SUPERNODE
COLUMNS        DEPENDENCIES

S1: 1,2        D:
S2: 3,4        D:
S3: 5,6        D:
S4: 7,8        D: S1,S3
S5: 9,10       D: S2,S4
S6: 11,12      D: S5

SUPERNODE DATA STRUCTURE
```

505 = { S1..S6 rows }, 510 = dependencies bracket, 500 = overall

FIG. 5B

```
SUPERNODE      SUPERNODE
COLUMNS        DEPENDENCIES

S1: 1,2        D:
S2: 3,4        D:
S3: 5,6        D:
S4: 7          D: S1,S3
S5: 8,9,10     D: S1*,S2,S3*,S4
S6: 11,12      D: S5

SUPERNODE DATA STRUCTURE
```

```
SUPERNODE      SUPERNODE
COLUMNS        DEPENDENCIES

S1: 1,2        D:
S2: 3,4        D:
S3: 5,6        D:
S4: 7          D: S1,S3
S5: 9,10       D: (S1),S2,(S3),S4
S6: 8,11,12    D: S1*,S3*,S5

SUPERNODE DATA STRUCTURE
```

550, 552, 554, 556

MAINTAINING DEPENDENCIES AMONG SUPERNODES DURING REPEATED MATRIX FACTORIZATIONS

BACKGROUND

Embodiments of the invention are generally directed to techniques for identifying and maintaining dependency relationships between matrix supernodes during matrix factorization. More specifically, embodiments presented herein maintain a list of dependencies for each supernode in a data structure and augment the list as needed when a column is moved from one supernode to another.

A variety of scientific applications require the computation of a vector x which satisfies the matrix equation $A*x=b$, where A is an n-by-n symmetric matrix and b is an n-by-1 matrix (i.e., a column vector). Often this is required for a sequence of related matrices A in which the values of the matrix change, but the location of non-zero values remains the same for all matrices A in the sequence.

A common method for computing vector x is to factor matrix A into two n-by-n matrices $A=L*L'$, where L' denotes the transpose of L. The structure of L makes it easy to compute x by first computing a vector y such that $L*y=b$, then computing x as the solution of $L'*x=y$. To improve the computational efficiency of the matrix factorization, systems typically take advantage of the sparse nature of A by storing the matrix data in a "supernodal" data structure, where adjacent columns in the matrix with a similar pattern of rows in which the non-zeros appear are stored in a packed array of floating point numbers called a supernode. Over the course of the factorization, a column may be moved from one supernode to another (referred to as "deferring a column) if doing so may result in less numerical error in the computation. Further, one common operation that occurs during matrix factorization is to perform a sparse matrix multiplication and addition that modifies a supernode S based on the values stored in a supernode T, such that supernode T has a non-zero row corresponding to a column of S. This operation may be referred to as "an external update of S by T" and supernode S may be said to "depend" on supernode T.

One existing approach to determine which supernodes a supernode S depends on is to iterate over all supernodes of the matrix at the beginning of each factorization, and for each supernode T, for each supernode S that depends on T, add T to a data structure that belongs to the supernode S. However, where factorization is required for a series of symmetric matrices A in which the location of non-zeros is the same in each matrix in the series, iterating over all supernodes at the beginning of each factorization adds significant overhead to the factorization.

SUMMARY

One embodiment provides a method for maintaining dependencies among supernodes during repeated matrix factorizations of sparse matrices. This method may generally include determining a set of supernodes of the sparse matrices, and for each determined supernode, determining a set of zero or more supernodes on which the supernode depends. Once the supernodes and supernode dependencies are determined, during one or more successive rounds of factorizing the sparse matrices, at least a column assigned to a first one of the supernodes may be deferred to a second one of the supernodes. When this occurs, the method also includes identifying one or more supernodes on which the first supernode depends and updating the set of supernodes on which the second supernode depends to include one or more of the supernodes on which the first supernode depends.

In a particular embodiment, after one of the successive rounds of factorizing the sparse matrices, the set of supernodes on which each supernode depends are evaluated to identify false positives supernode dependencies resulting from a plurality of column deferrals occurring during the successive rounds of factorizing the sparse matrices. Further, upon determining a count of the false positive supernode dependencies exceeds a specified threshold, for each supernode, the set of zero or more supernodes on which the supernode depends are predetermined.

Additional embodiments include a computer-readable storage medium storing an application, which, when executed on a processor, performs the above recited method as well as a system having a processor and a memory storing an content analytics tool configured to respond to evaluate data collections for multiple tenants by performing aspects of the method recited above.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

FIG. 4 illustrates an example symmetric matrix, according to one embodiment of the invention.

FIG. 5A-5C illustrates an example of maintaining a supernode dependency data structure as columns are deferred during factorization, according to one embodiment of the invention.

DETAILED DESCRIPTION

Figure 1:
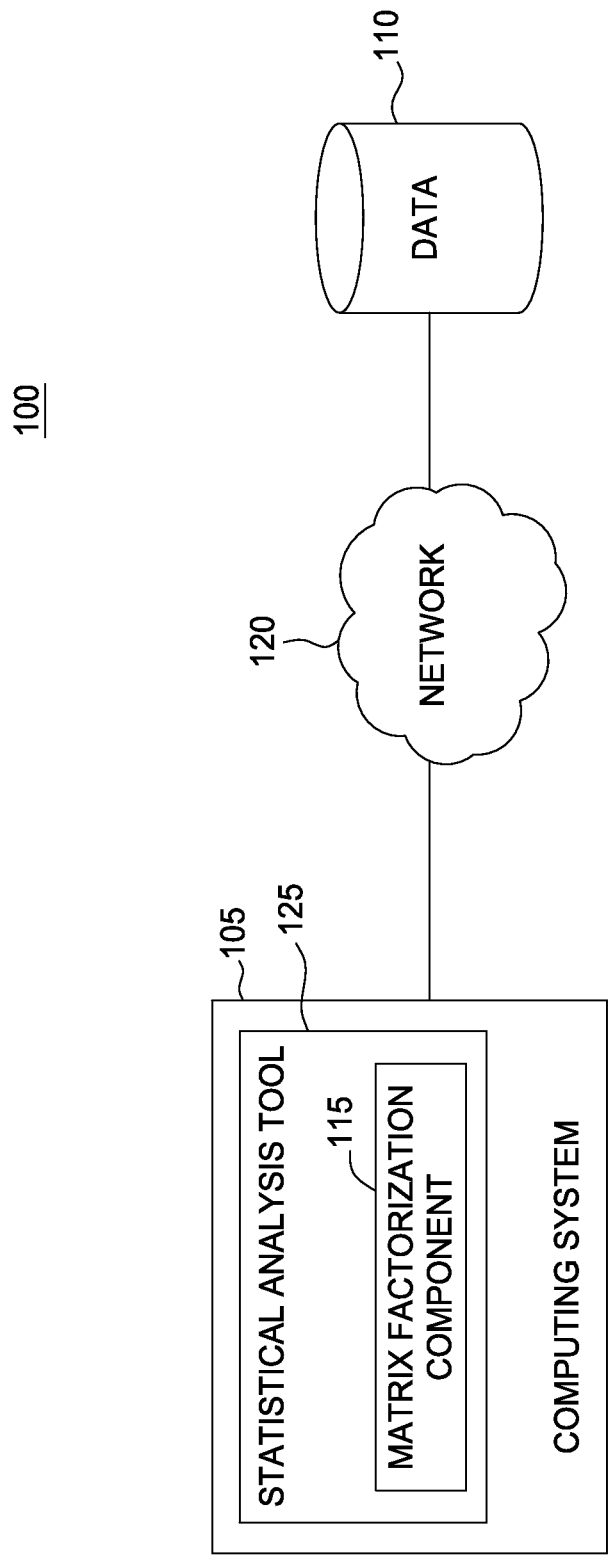
FIG. 1 illustrates an example computing infrastructure used to maintain dependencies among supernodes during repeated matrix factorizations, according to one embodiment of the invention.

Embodiments of the invention provide techniques for determining dependency relationships between supernodes by storing a list of dependencies for each supernode in a data structure and augmenting this list as needed when a column is moved from one supernode to another. In cases where factorization is required for a series of matrices $A_i$, iterating over all supernodes to determine which supernodes a given supernode depends on at the beginning of each factorization adds significant overhead to the factorization. In contrast, embodiments described herein retain the supernode dependency information for each successive factorization, greatly reducing the overhead of the dependency determination.

Storing dependencies for each supernode as part of the supernode data structure without augmenting the list as needed when a column is moved from one supernode to another prevents columns from being moved one supernode to another, which restricts the quality of the numerical results of the factorization by forcing low-quality pivot selections to be made in some cases. Accordingly, in one embodiment, rather than restrict column movement, the supernode dependencies are updated when a column is moved from one supernode to another. For example, given a supernode X, assume the set of supernodes on which supernode X depends is given by dep(X). Thus, if a supernode Y is in dep(X), an external update of X by Y is computed in the course of the determining a factorization of X. It may be the case that when moving a column i from supernode S to supernode T, there is a supernode in dep(S) that is not in dep(T). However, after moving this column, supernode T will depend on the supernodes in dep(S) that have non-zeros in row i. In one embodiment, to address this issue, the set dep(T) is augmented with the contents of dep(S) whenever a column is moved between supernodes this way.

Further, to achieve this efficiently, the set dep(X) may be stored as part of a supernode data structure L that supports traversing all its members in time proportional to the number of members of L, such as an array of integers. In the course of the factorization, columns may be moved from several supernodes $(S_1, \ldots, S_k)$ to a supernode T. When this occurs, members of dep(T) are used to populate a data structure D for which the operations (1) adding a new member and (2) checking if a member is in the set are both O(1) operations, such as a hash table. Then, the members of $dep(S_1)$ through $dep(S_k)$ are added to D. Lastly, the members of D are extracted back to the original supernode data structure L.

Note, in some cases, supernode S contains a row i corresponding to a column of supernode T and then column i is moved from supernode T to supernode U. If row i was the only row of supernode S that corresponded to a column of supernode T, then after this point supernode T no longer depends on supernode S, and thus an external update of T by S does not need to be computed. That is, leaving T in the set dep(S) results in a "false positive," where the update is calculated but does not actually result in an update to T. Accordingly, in one embodiment, the number of false positives in the factorization may be tracked and when it grows too large (e.g., relative to the number of supernodes) the current supernode dependency data structure is recomputed. Otherwise, if a number of column movements occur, the set dep(X) can grow to include nearly every supernode and the overhead introduced by these false positives can dominate the factorization time.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN) or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates an example computing infrastructure 100 used to maintain dependencies among supernodes during repeated matrix factorizations, according to one embodiment of the invention. As shown, the computing infrastructure 100 includes a computing system 105 and a database 110 each connected to a network 120. As shown, the computing system includes a statistical analysis tool 125, such as the CPLEX Mathematical Optimization Engine and related software applications available from IBM®. Database 110 provides the underlying data evaluated by the analytics tool 120.

One common function required by analytics tool 120 (such as CPLEX) is the ability to rapidly compute complex matrix operations. As noted above, e.g., a variety of applications use matrix factorization to decompose a symmetric matrix A into L and L', where A=L*L', i.e., where L' denotes the transpose of L. And this is often required for a sequence of related matrices A in which the values of the matrix change, but the location of non-zero values remains the same for all matrices A in the sequence.

In one embodiment, to perform such a factorization of a series of matrices $A_i$, a matrix factorization component 115 of the statistical analysis tool 125 store may store the each matrix $A_i$ in a supernodal data structure, i.e., as a set of supernodes. A supernode is a contiguous set of columns from a symmetric matrix which have an identical set of non-zeroes for each column below this diagonal. For example, FIG. 4 illustrates an example matrix 400 where columns 1 and 2 form a supernode, as the rows of columns 1, 2 share an identical pattern of non-zero values. In this example, non-zero values are denoted by "*" characters. For the same reasons, the columns of matrix 400 include the following additional supernodes: {3, 4}, {5, 6}, {7, 8}, {9, 10}, and {11, 12}. Representing the non-zero values of the matrix A using supernodes in a compact array of floating point values can greatly improve the computational efficiency of matrix operations. For example, when a column from one supernode updates another column, each column in that supernode will also update that column. As a result, contributions to a matrix operation for all the columns in the supernode may be combined to form a supernode contribution, which can be used to apply the matrix operation for all columns in the supernode at once.

Further, as noted above, one supernode may depend on another. For example, one common operation that occurs during matrix factorization is to perform a sparse matrix multiplication and addition that modifies a supernode S based on the values stored in a supernode T, such that supernode T has a non-zero row corresponding to a column of S, referred to as "an external update of S by T." In such cases, supernode S may be said to "depend" on supernode T.

The matrix factorization component 115 set may be configured to iterate over the supernodes of the matrix $A_i$ at the beginning of the factorization process to generate a supernode dependency data structure. Such a data structure may identify the supernodes of a matrix $A_i$ as well as the dependencies among the supernodes. In one embodiment, because the matrices $A_i$ in the series share a common pattern of non-zero locations, the supernodal data structure and supernode dependency data structure can be re-used for successive factorizations of matrices $A_i$ in the series. That is, dependencies between supernodes come from the overall structure of the matrix itself, and not from the individual values in the matrices $A_i$ in the series. This property allows the dependency data structure to be reused.

However, during factorization, a column in one supernode may be deferred to another, at least in some cases where doing so would improve the accuracy of the matrix operation being performed. Column deferral refers to the process of changing the order in which the mathematical steps of the matrix factorization are performed. This requires modifying the data structure that represents the matrix, since the data structure is optimized based in part on the order that has been chosen to execute the steps. The initial order is chosen with speed in mind; column deferral allows for numerical accuracy to be considered as the algorithm progresses. In one embodiment, to account for column deferrals that occur during factorization, the matrix factorization component 115 may update the dependency data structure as columns are deferred from one supernode to another. Doing so avoids the overhead of having to recreate the supernode dependency structure for each matrix in the series.

As an example of when a column would be deferred, consider the following matrix:

$$\begin{bmatrix} 0 & 0 & 1 \\ 0 & 1 & 0 \\ 1 & 0 & 1 \end{bmatrix} \qquad \text{Eq. (1)}$$

This 3×3 matrix would start out as three separate supernodes, one for each column. The first step in factorization would be to attempt to divide the off-diagonals in the first column by the first diagonal. Since the diagonal is 0.0, a floating point error would result. The solution is to defer the first column to its parent supernode, (which in this case is the supernode of the third column). In practice, any diagonal value below some numerical threshold will result in a deferral, not only exact zeros.

However, while deferral can improve numerical accuracy, deferral may also result in "false positives" in the dependency data structure. That is, the dependency data structure may indicate that a given supernode S depends on supernode T, when in fact it does not as a result of a column deferral. Such false positives are harmless in that they do not corrupt the matrix operations being performed, but can result in unnecessary calculations or memory references to a supernode occurring. Because of this, in one embodiment, the matrix factorization component 115 may be configured to re-compute the dependency set after a set number of column deferrals or after the relative percentage of false positives exceeds a certain percentage of the overall dependencies of the dependency data structure.

Figure 2:
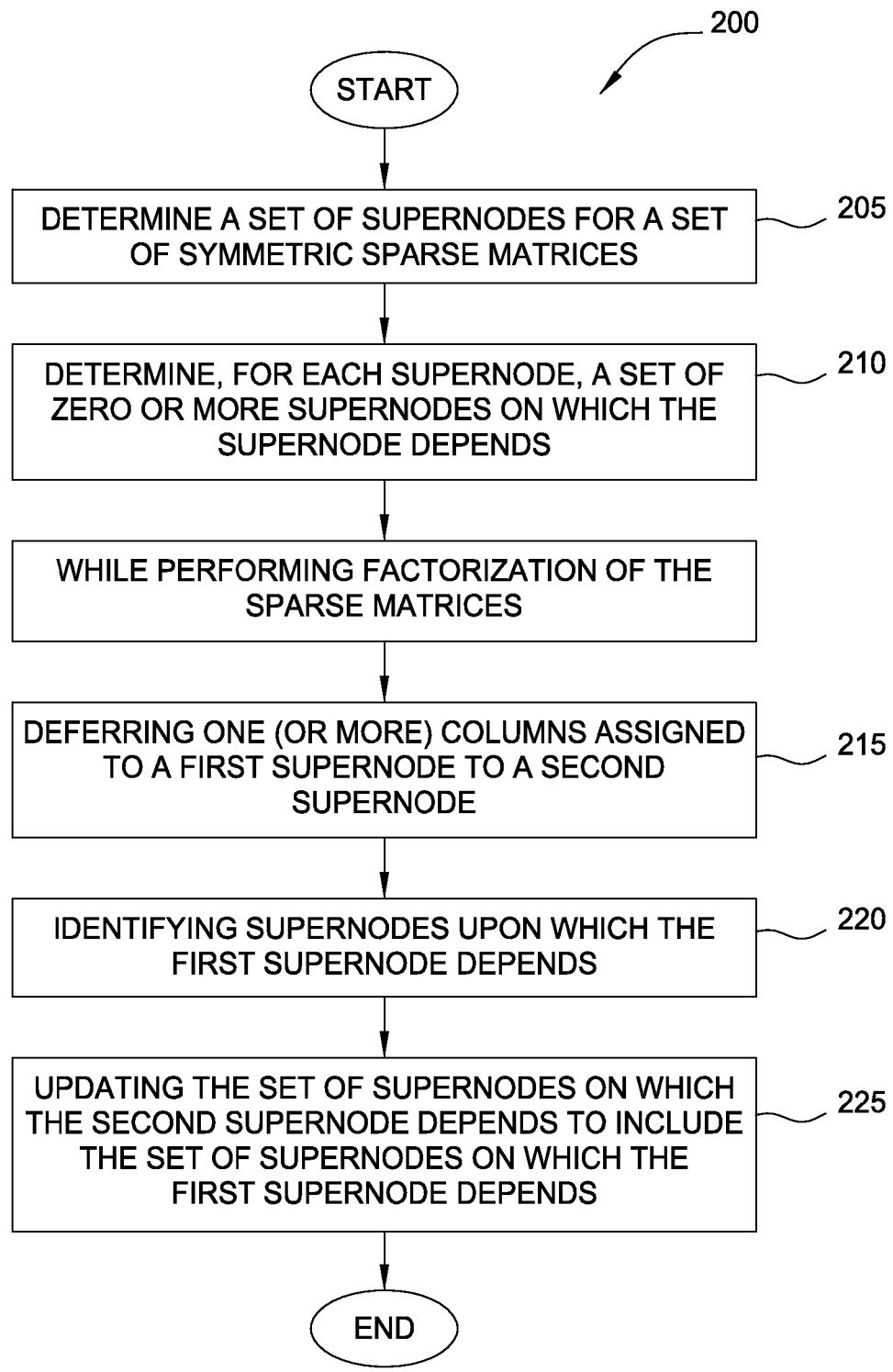
FIG. 2 illustrates a method for maintaining dependencies among supernodes during repeated matrix factorizations, according to one embodiment of the invention.

FIG. 2 further illustrates the approach discussed above for maintaining dependencies among supernodes during repeated matrix factorizations, according to one embodiment of the invention. As shown, a method 200 begins at step 205, where a matrix factorization component determines a set of supernodes for a series of symmetric sparse matrices $A_i$. At step 210, the matrix factorization component determines a set of dependencies among the supernodes. As the set of matrices $A_i$ may each share a common overall structure or pattern of zero and non-zero values. As a result, the set of matrices $A_i$ share a common set of supernodes.

For example, FIG. 4 shows a symmetric matrix with the following supernodes S1-S6: S1={1, 2} S2={3, 4}, S3={5, 6}, S4={7, 8}, S5={9, 10}, and S6={11, 12}. Assume that symmetric matrix 400 represents a series of matrices A, each of which share the same general structure of zero and non-zero values and, therefore, also share this same set of supernodes. Further, assume that the factorization component determines that supernode S4 depends on {S1, S3}, that S5 depends on {S2, S4}, and that S6 depends on {S5}.

FIG. 5A illustrates an example supernode dependency data structure 500 corresponding to the supernodes of matrix 400 and dependencies stated above. As shown, the dependency data structure 500 includes a list 505 of supernodes (S1-S6). Each entry in list 500 also includes which columns are included in one of the supernodes. Further, a list 510 stores an indication of the dependencies determined at step 210. Each dependency indicates that a supernode S depends on supernode T, if, and only if, T performs an external update of S during matrix factorization. Again, because the set of matrices $A_i$ share a common overall structure, this set of matrices $A_i$ also shares the supernodes in list 505 and supernodes dependencies in list 510.

At the same time, as columns may be deferred or otherwise moved from one supernode to another to improve computational accuracy of matrix factorization, the dependency data structure 500 can become inaccurate. Accordingly, in one embodiment, the matrix factorization component may update the data structure 500 during the matrix factorization process. Referring again to method 200, at step 215, the factorization component may defer one (or more) columns from a first supernode to a second supernode while performing a matrix factorization. After deferring a column, the factorization component may identify supernodes on which the first supernode depends (step 220) and update the set of supernodes of the second supernode accordingly (step 225). That is, when a column is moved from one supernode to another (step 215), the matrix factorization component copies the dependencies of the supernode from which the column originated to the supernode to which the column is moved.

For example, FIG. 5B illustrates an example supernode dependency data structure 530 after a column is deferred from one supernode to another, according to one embodiment. In this example, column 8, originating in supernode S4, is deferred to supernode S5 and the supernodes which supernode S4 depend upon are copied to supernode S5. As shown, an entry 532 for supernode S4 now shows that this supernode includes column 7 and an entry 534 shows that supernode S5 now includes columns 8, 9, and 10. For this example assume that supernode S4 still depends on supernodes S1 and S3 based on column 7 (the only remaining column in supernode S4). Alternatively, if these dependencies were no longer valid, then the factorization component could mark them as representing false-positive dependencies in the data structure 530 (an example of a false positive dependency is discussed below in conjunction with FIG. 5C).

An entry 536 in data structure 534 shows the updated dependencies for supernode S5. Specifically, entry 536 has been updated to reflect that the dependencies of supernode S4 (the originating supernode of the deferral) include supernodes S1 and S3. As shown, the entries are marked in the data structure 530 with to denote that the dependencies are the result of a column deferral. Storing an indication of a dependency resulting from a deferral allows the dependency data structure to be maintained in the event of subsequent deferrals. For example, FIG. 5B illustrates an example supernode dependency data structure 550 after another column deferral is made to a matrix during factorization operations, according to one embodiment.

In the example of FIG. 5C, column 8 is deferred a second time, from supernode S5 to S6. This may occur, for example, to improve the factorization of one of the matrices in $A_i$. As a result, an entry 552 for supernode S6 now includes column 8, in addition to columns 9 and 10. Further, an entry 556 listing the dependencies of supernode S6 now includes supernodes S1 and S2 as well as indicating that supernodes S1 and S2 are dependencies that resulted from a column deferral. This example illustrates that when a column is deferred more than once, only the dependencies of the originating supernode of that column are copied. In this example, supernodes S2 and S4 (which supernode S5 depends upon) are not copied with the deferral of column 8, as the originating supernode of this column (i.e., supernode S4) do not depend upon these supernodes. Further, an entry 554 listing a set of dependencies for supernode S5 (from which column 8 is being deferred) is updated to reflect that the dependencies on supernodes S1 and S3 are now false positives, i.e., that supernode S5 does not depend on supernodes S1 and S3.

It often happens that a "false positive" dependence relationship later becomes a true dependence relationship as more deferrals are performed. The overhead of removing and re-adding such elements from dependency sets is large enough that it is not advantageous to remove false positives at the moment that they are detected.

In some cases, a supernode S contains a row i corresponding to a column of supernode T and then column i is moved from supernode T to supernode U. If row was the only row of supernode S that corresponded to a column of supernode T, then after this point supernode T no longer depends on supernode S, and thus we no longer need to compute an external update of T by S.

More generally, the supernode dependency data structure may store information required to determine which nodes need to be copied from one supernode to another as a result of a column deferral (e.g., the supernode dependencies from that column's original supernode assignment prior to any deferrals) as well as identify false positive dependencies resulting from a column deferral (e.g., when a column is deferred multiple times or when a column is deferred from an originating supernode is the only column in that supernode or the only column in that supernode underlying a given dependency).

As noted, some column deferrals may result in false positives in the supernode dependency data structure. And further, that such false positives generally do not interfere with the matrix factorization, but that can reduce the efficiency of such factorization. Accordingly, in one embodiment, the dependencies may be re-evaluated once the number of thresholds exceeds a specified threshold (e.g., a percentage of false positives to total dependencies).

Figure 3:
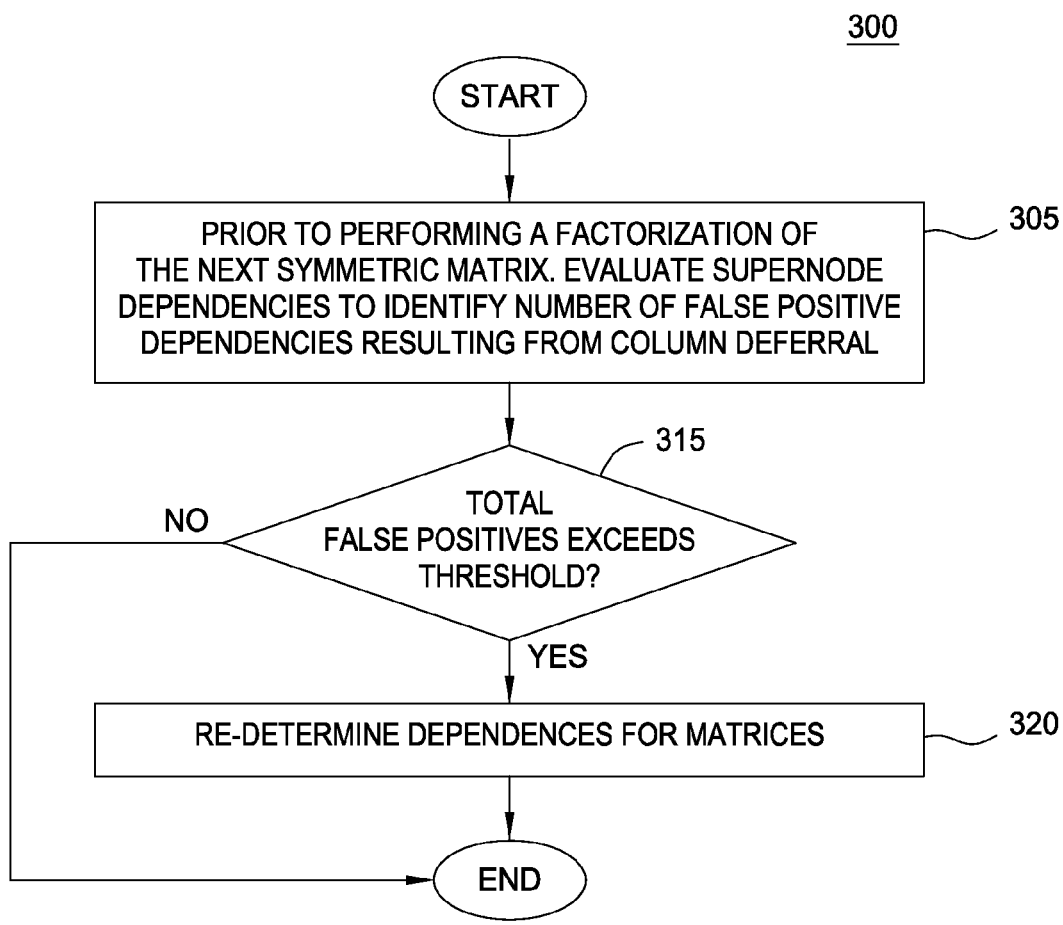
FIG. 3 illustrates a method evaluating a supernodal dependency data set, according to one embodiment of the invention.

FIG. 3 illustrates a method 300 evaluating a supernodal dependency data set, according to one embodiment of the invention. As shown, the method 300 begins at step 305 where the matrix factorization component evaluates the supernode dependency data structure to determine a count of false positives that are present in this data structure as a result of column deferrals. In one embodiment, the matrix factorization component may perform step 305 prior to initializing a matrix factorization of the next matrix A in a series of symmetric matrices A that require factorization.

Once the number of false positives is identified (step 305), the matrix factorization component determines whether the number of false positives exceeds a specified threshold (step 315), e.g., a numerical count, a relative percentage of false positives, etc. If so, then at step 320, the matrix factorization component may re-determine a set of supernode dependencies based on the current set of supernodes (i.e., the set of supernodes after one (or more) column deferrals have occurred during prior rounds of factorization). That is, the matrix factorization component may effectively reset the dependency data structure to remove false positives. Thereafter, the factorization component may resume factorizing matrices in the series $A_i$, as well as continue to defer columns and update the supernode dependency data structure according to the techniques described above.

Figure 6:
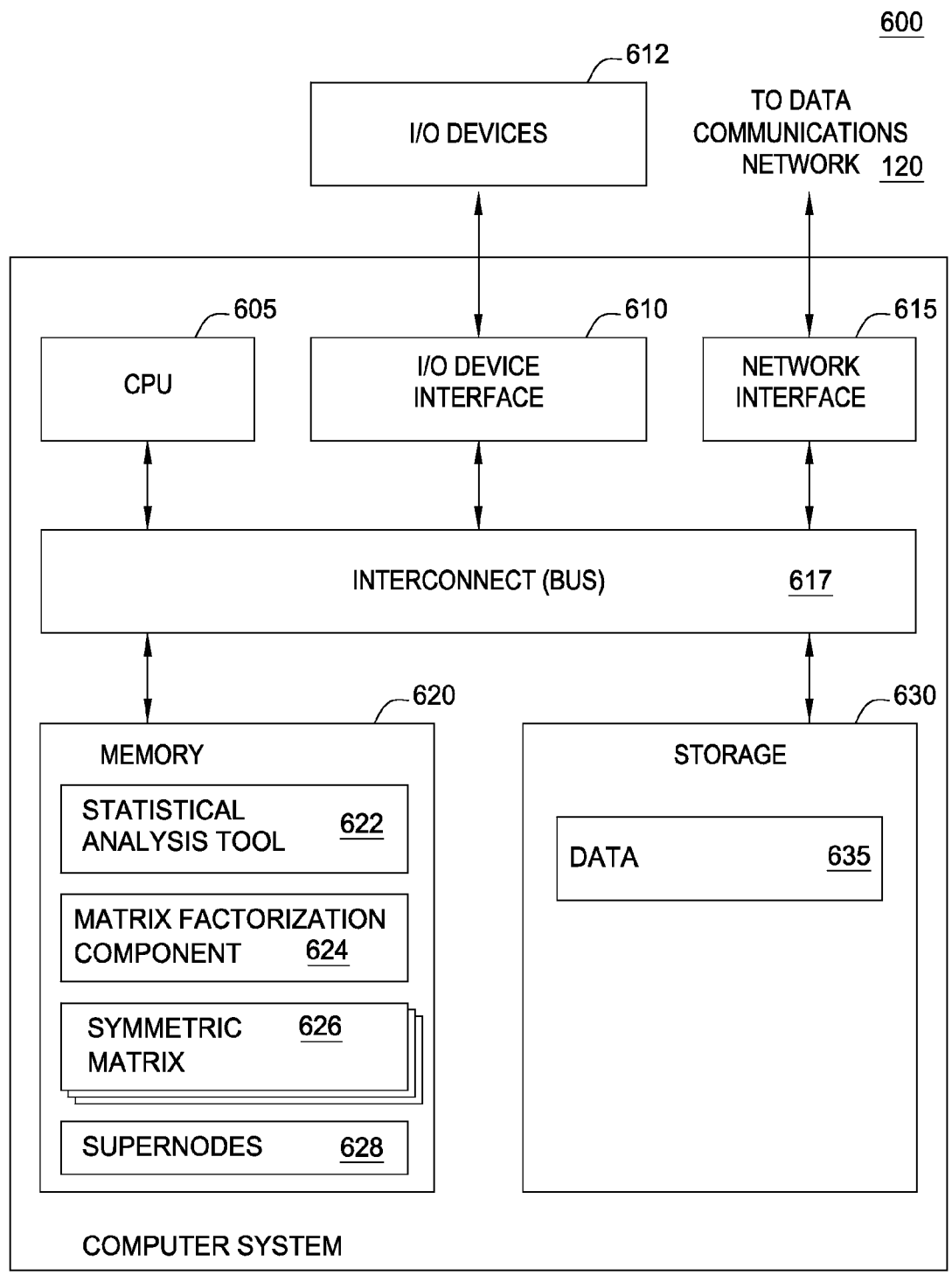
FIG. 6 illustrates an example computing system configured according to one embodiment of the invention.

FIG. 6 illustrates an example computing system 600 configured according to one embodiment of the invention. As shown, the computing system 600 includes, without limitation, a central processing unit (CPU) 605, a network interface 615, a memory 620, and storage 630, each connected to a bus 617. The computing system 600 may also include an I/O device interface 610 connecting I/O devices 612 (e.g., keyboard, display and mouse devices) to the computing system 600.

The CPU 605 retrieves and executes programming instructions stored in the memory 620 as well as stores and retrieves application data residing in the memory 630. The interconnect 617 is used to transmit programming instructions and application data between the CPU 605, I/O devices interface 610, storage 630, network interface 615, and memory 620. Note, CPU 605 is included to be representative of a single CPU, multiple CPUs, a single CPU having multiple processing cores, and the like. The memory 602 is included to be generally representative of a random access memory, such as commodity DRAM modules. The storage 630 may be a disk drive storage device. Although shown as a single unit, the storage 630 may be a combination of fixed and/or removable storage devices, such as fixed disc drives, flash based storage, optical storage, network attached storage (NAS), or a storage area-network (SAN).

As shown, the memory 620 includes a statistical analysis tool 622, a matrix factorization component 624, a series of symmetric matrices 626, and supernode data structure 628. And the storage 630 includes data 635. The statistical analysis tool 622 generally provides one or more software applications configured perform a variety of statistical analytics computations against data 635 (e.g., the CPLEX® suite of data analytics tools mentioned above). The matrix factorization component provides one or more software applications used to perform a series of repeated matrix factorizations against symmetric matrices 626. Matrices 515 may have a common pattern of non-zero locations, and as a result, the supernode data structure 628 can be re-used for successive factorizations of matrices 628, while also allowing for column deferrals while performing the factorizations.

Advantageously, embodiments of the invention provide techniques for determining dependency relationships between supernodes by storing a list of dependencies for each supernode in a data structure and augmenting this list as needed when a column is moved from one supernode to another while factorizing a series $A_i$ of symmetric matrices. As iterating over all supernodes to determine which supernodes a given supernode depends on at the beginning of each factorization adds significant overhead to the computation, embodiments described above maintains a supernode dependency data structure used for each successive factorization, greatly reducing the overhead of the dependency determination.

While the foregoing is directed to embodiments of the present invention, other and further embodiments of the invention may be devised without departing from the basic scope thereof, and the scope thereof is determined by the claims that follow.

What is claimed is:

1. A computer-implemented method for maintaining dependencies among supernodes during repeated matrix factorizations of sparse matrices, comprising:
   determining a set of supernodes of the sparse matrices;
   for each determined supernode, determining a set of zero or more supernodes on which the supernode depends;
   during one or more successive rounds of factorizing the sparse matrices:
      deferring at least a column assigned to a first one of the supernodes to a second one of the supernodes,
      identifying one or more supernodes on which the first supernode depends, and
      updating the set of supernodes on which the second supernode depends to include one or more of the supernodes on which the first supernode depends.

2. The method of claim 1, further comprising:
   after one of the successive rounds of factorizing the sparse matrices, evaluating the set of supernodes on which each supernode depends to identify false positives supernode dependencies resulting from a plurality of column deferrals occurring during the successive rounds of factorizing the sparse matrices; and
   upon determining a count of the false positive supernode dependencies exceeds a specified threshold, for each supernode, re-determining the set of zero or more supernodes on which the supernode depends.

3. The method of claim 2, wherein the threshold specifies a maximum relative percentage of false positives for the set of supernodes on which each supernode depends.

4. The method of claim 1, wherein each supernode identifies a set of zero or more columns of the sparse matrix and wherein each column of the sparse matrix is assigned to exactly one supernode.

5. The method of claim 1, further comprising, marking supernodes included in the set of supernodes on which the second supernode depends as a result of the update to reflect their inclusion in the of supernodes on which the second supernode depends as a result of the deferral of the column.

6. The method of claim 1, wherein a supernode X depends on each supernode Y that includes a non-zero row i of the sparse matrix such that i is a column of the sparse matrix assigned to the supernode.

7. The method of claim 1, wherein the sparse matrices comprise a series of symmetric matrices, each sharing a common pattern of zero and non zero values.

8. A non-transitory computer-readable storage medium storing one or more application programs, which, when executed on a processor perform an operation for maintaining dependencies among supernodes during repeated matrix factorizations of sparse matrices, the operation comprising:
   determining a set of supernodes of the sparse matrices;
   for each determined supernode, determining a set of zero or more supernodes on which the supernode depends;
   during one or more successive rounds of factorizing the sparse matrices:
      deferring at least a column assigned to a first one of the supernodes to a second one of the supernodes,
      identifying one or more supernodes on which the first supernode depends, and
      updating the set of supernodes on which the second supernode depends to include one or more of the supernodes on which the first supernode depends.

9. The non-transitory computer-readable medium of claim 8, wherein the operation further comprises:
   after one of the successive rounds of factorizing the sparse matrices, evaluating the set of supernodes on which each supernode depends to identify false positives supernode dependencies resulting from a plurality of column deferrals occurring during the successive rounds of factorizing the sparse matrices; and
   upon determining a count of the false positive supernode dependencies exceeds a specified threshold, for each supernode, re-determining the set of zero or more supernodes on which the supernode depends.

10. The non-transitory computer-readable medium of claim 9, wherein the threshold specifies a maximum relative percentage of false positives for the set of supernodes on which each supernode depends.

11. The non-transitory computer-readable medium of claim 8, wherein each supernode identifies a set of zero or more columns of the sparse matrix and wherein each column of the sparse matrix is assigned to exactly one supernode.

12. The non-transitory computer-readable medium of claim 8, wherein the operation further comprises, marking supernodes included in the set of supernodes on which the second supernode depends as a result of the update to reflect their inclusion in the of supernodes on which the second supernode depends as a result of the deferral of the column.

13. The non-transitory computer-readable medium of claim 8, wherein a supernode X depends on each supernode Y that includes a non-zero row i of the sparse matrix such that i is a column of the sparse matrix assigned to the supernode.

14. The non-transitory computer-readable medium of claim 8, wherein the sparse matrices comprise a series of symmetric matrices, each sharing a common pattern of zero and non zero values.

15. A system, comprising:
   a processor; and
   a memory storing an application program configured to perform an operation for operation for maintaining dependencies among supernodes during repeated matrix factorizations of sparse matrices, the operation comprising:
   determining a set of supernodes of the sparse matrices,
   for each determined supernode, determining a set of zero or more supernodes on which the supernode depends,
   during one or more successive rounds of factorizing the sparse matrices:
      deferring at least a column assigned to a first one of the supernodes to a second one of the supernodes;
      identifying one or more supernodes on which the first supernode depends; and
      updating the set of supernodes on which the second supernode depends to include one or more of the supernodes on which the first supernode depends.

16. The system of claim 15, wherein the operation further comprises:
   after one of the successive rounds of factorizing the sparse matrices, evaluating the set of supernodes on which each supernode depends to identify false positives supernode dependencies resulting from a plurality of column deferrals occurring during the successive rounds of factorizing the sparse matrices; and
   upon determining a count of the false positive supernode dependencies exceeds a specified threshold, for each supernode, re-determining the set of zero or more supernodes on which the supernode depends.

17. The system of claim 16, wherein the threshold specifies a maximum relative percentage of false positives for the set of supernodes on which each supernode depends.

18. The system of claim 15, wherein each supernode identifies a set of zero or more columns of the sparse matrix and wherein each column of the sparse matrix is assigned to exactly one supernode.

19. The system of claim 15, wherein the operation further comprises, marking supernodes included in the set of supernodes on which the second supernode depends as a result of the update to reflect their inclusion in the of supernodes on which the second supernode depends as a result of the deferral of the column.

20. The system of claim 15, wherein a supernode X depends on each supernode Y that includes a non-zero row i of the sparse matrix such that i is a column of the sparse matrix assigned to the supernode.

21. The system of claim 15, wherein the sparse matrices comprise a series of symmetric matrices, each sharing a common pattern of zero and non zero values.

* * * * *